United States Patent
Choi

(10) Patent No.: US 12,222,321 B2
(45) Date of Patent: Feb. 11, 2025

(54) APPARATUS FOR INSPECTING A TUBE AND METHOD OF INSPECTING A TUBE USING THE APPARATUS

(71) Applicant: Samsung Electronics Co., Ltd., Suwon-si (KR)

(72) Inventor: Wongoo Choi, Suwon-si (KR)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 147 days.

(21) Appl. No.: 18/064,065

(22) Filed: Dec. 9, 2022

(65) Prior Publication Data
US 2023/0375505 A1    Nov. 23, 2023

(30) Foreign Application Priority Data
May 18, 2022 (KR) .................. 10-2022-0060643

(51) Int. Cl.
G01N 27/90       (2021.01)
B23K 31/12       (2006.01)

(52) U.S. Cl.
CPC ....... G01N 27/9006 (2013.01); B23K 31/125 (2013.01)

(58) Field of Classification Search
CPC .................. G01N 27/9006; B23K 31/125
See application file for complete search history.

(56) References Cited

U.S. PATENT DOCUMENTS

| 9,541,526 B2 | 1/2017 | Kubota et al. |
| 9,746,446 B2 * | 8/2017 | Faucher ............... G01N 29/041 |
| 10,788,456 B2 | 9/2020 | Lee et al. |
| 10,928,360 B2 | 2/2021 | Xiong et al. |
| 2016/0025682 A1 | 1/2016 | Walker et al. |
| 2022/0178878 A1 * | 6/2022 | Russell .................. G01N 27/87 |
| 2023/0142556 A1 * | 5/2023 | Stewart ................ G01N 29/262 |
| | | 335/296 |

FOREIGN PATENT DOCUMENTS

| KR | 101636247 B1 | 7/2016 |
| KR | 101915721 B1 * | 11/2018 |
| KR | 101966168 B1 | 4/2019 |
| KR | 102140966 B1 | 8/2020 |
| KR | 102236995 B1 | 4/2021 |
| KR | 1020210107997 A | 9/2021 |
| WO | WO-0101123 A1 * | 1/2001 | ......... G01N 27/9013 |
| WO | WO-2021212213 A1 * | 10/2021 | ......... A45C 13/1069 |

* cited by examiner

Primary Examiner — Walter L Lindsay, Jr.
Assistant Examiner — Milton Gonzalez
(74) Attorney, Agent, or Firm — Harness, Dickey & Pierce, P.L.C.

(57) ABSTRACT

An apparatus for inspecting a tube may include a first probe holder, a second probe holder, and an eddy current sensor. The first probe holder may be configured to hold a first portion of the tube. The second probe holder may be rotatably connected to the first probe holder with respect to an axial direction of the tube, the second probe holder configured to hold a second portion of the tube. The eddy current sensor may be on any one of the first probe holder and the second probe holder, the eddy current sensor configured to inspect at least one welding portion of the tube using at least one eddy current. Thus, the eddy current sensor may accurately inspect the welding portion of the small tube held by the first probe holder and the second probe holder.

16 Claims, 5 Drawing Sheets

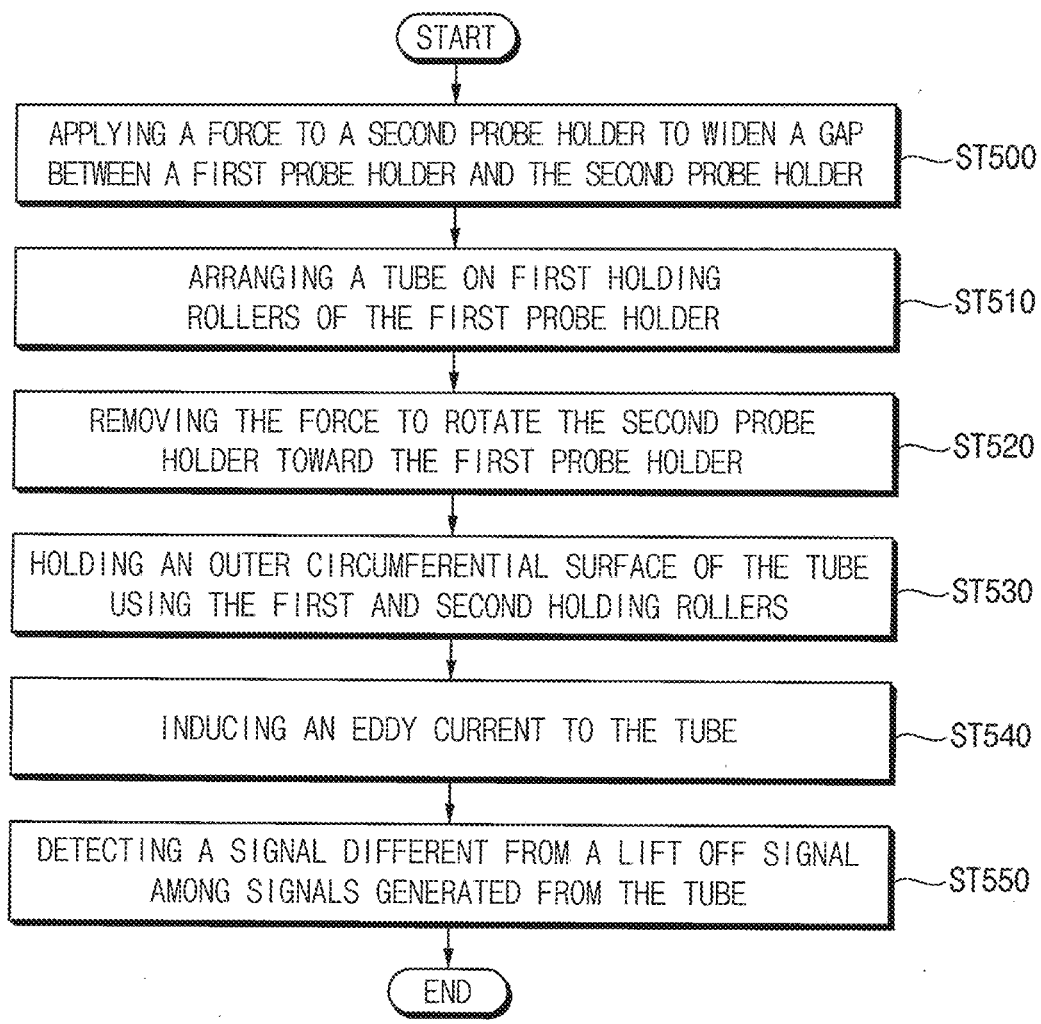

APPARATUS FOR INSPECTING A TUBE AND METHOD OF INSPECTING A TUBE USING THE APPARATUS

CROSS-RELATED APPLICATION

This U.S. non-provisional application claims the benefit of priority under 35 USC § 119 to Korean Patent Application No. 10-2022-0060643, filed on May 18, 2022, in the Korean Intellectual Property Office (KIPO), the contents of which are herein incorporated by reference in their entirety.

BACKGROUND

1. Field

Various example embodiments relate to an apparatus for inspecting a tube, a system including the apparatus, and/or a method of inspecting a tube using the apparatus, etc. More particularly, one or more example embodiments relate to an apparatus for inspecting a welding portion of a tube and/or a method of inspecting a welding portion of a tube using the apparatus, etc.

2. Description of the Related Art

Generally, a non-destructive test may be applied to an inspection of a welding portion on and/or in a tube. The non-destructive test may use an eddy current generated by an eddy current array. The eddy current may be applied to the tube. A lift-off signal of an eddy current array outputted by the tube may be analyzed to recognize whether the welding portion of the tube may be normal or not (e.g., whether the welding is satisfactory or not, etc.).

According to the related arts, it may be difficult to apply the inspection using the eddy current array to a small tube having a small and/or short diameter. The eddy current array may be readily wound on a large tube, e.g., a tube having a large diameter. In contrast, the eddy current array may not be readily wound on the small tube. Thus, the welding portion of the small tube may not be accurately inspected using the eddy current array.

SUMMARY

At least one example embodiment provides an apparatus for accurately inspecting a welding portion of a small tube using an eddy current.

At least one example embodiment also provides a method of inspecting a tube using the above-mentioned apparatus.

According to some example embodiments, there may be provided an apparatus for inspecting a tube. The apparatus may include a first probe holder, a second probe holder, and an eddy current sensor. The first probe holder may be configured to hold a first portion of the tube. The second probe holder may be rotatably connected to the first probe holder with respect to an axial direction of the tube, the second probe holder configured to hold a second portion of the tube. The eddy current sensor may be on any one of the first probe holder and the second probe holder, the eddy current sensor configured to inspect at least one welding portion of the tube using at least one eddy current.

According to some example embodiments, there may be provided an apparatus for inspecting a tube. The apparatus may include a first probe holder, a second probe holder, an eddy current sensor, and a hinge connector. The first probe holder may be configured to hold a first portion of the tube, the tube having a diameter between 6 mm and 12 mm. The second probe holder may be configured to hold a second portion of the tube. The eddy current sensor may be on the first probe holder, the eddy current sensor configured to inspect at least one welding portion of the tube using at least one eddy current. The hinge connector may be connected to the second probe holder and the first probe holder, the hinge connector configured to rotate with respect to an axial direction of the tube.

According to some example embodiments, there may be provided a method of inspecting a tube. The method may include arranging the tube between a first probe holder and a second probe holder, the first probe holder and the second probe holder rotatably connected to each other, rotating the second probe holder toward the tube, the rotating the second probe holder causing the second probe holder and the first probe holder to hold the tube, and inspecting at least one welding portion of the tube using an eddy current sensor, the inspecting including inducing at least one eddy current within the tube using the eddy current sensor, the eddy current sensor on the first probe holder.

According to some example embodiments, the second probe holder may be rotatably connected with the first probe holder via the hinge connector to firmly hold the small tube having a short diameter using the first probe holder and the second probe holder. Thus, the eddy current sensor module may accurately inspect the welding portion of the small tube held by the first probe holder and the second probe holder.

BRIEF DESCRIPTION OF THE DRAWINGS

Various example embodiments of the inventive concepts will be more clearly understood from the following detailed description taken in conjunction with the accompanying drawings. FIGS. 1 to 7 represent non-limiting, example embodiments of the inventive concepts as described herein.

FIGS. 1 and 2 are perspective views illustrating an apparatus for inspecting a tube in accordance with some example embodiments;

FIG. 3 is a front view illustrating the apparatus in FIG. 1 according to at least one example embodiment;

FIG. 4 is a plan view illustrating the apparatus in FIG. 1 according to at least one example embodiment;

FIG. 5 is a horizontal cross-sectional view illustrating the apparatus in FIG. 1 according to at least one example embodiment;

FIG. 6 is a vertical cross-sectional view illustrating the apparatus in FIG. 1 according to at least one example embodiment; and FIG. 7 is a flow chart illustrating a method of inspecting a tube using the apparatus in FIG. 1 according to at least one example embodiment.

DETAILED DESCRIPTION

Hereinafter, various example embodiments of the inventive concepts will be explained in detail with reference to the accompanying drawings.

Figure 1:
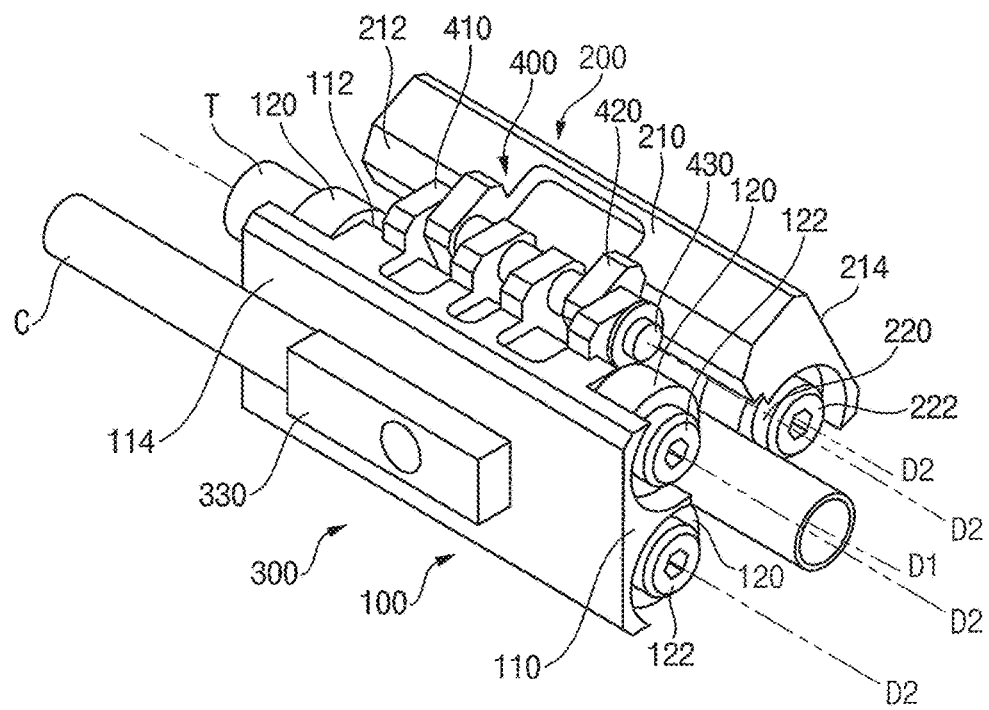
Figure 2:
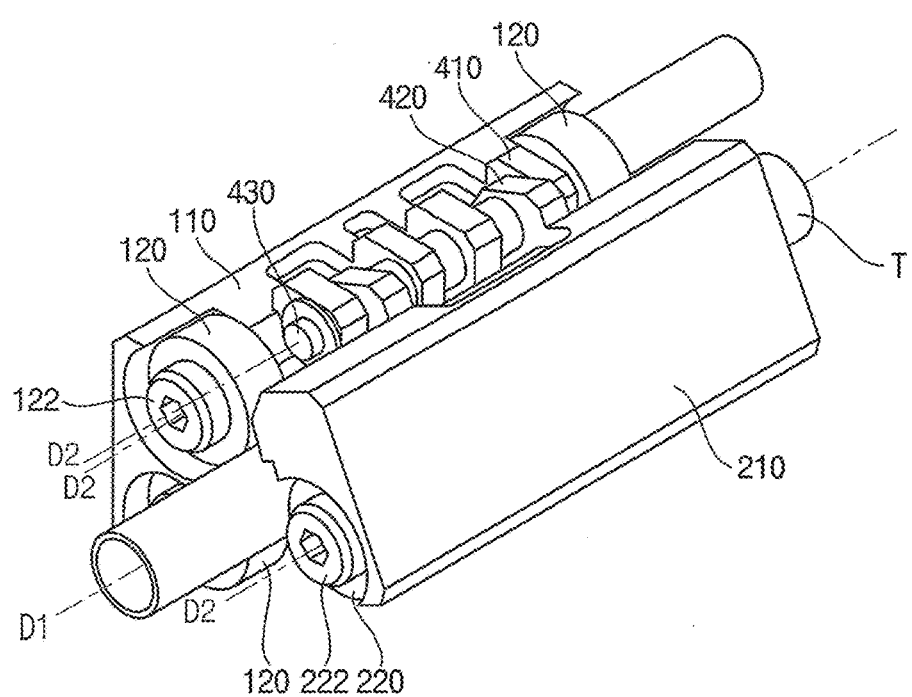
Figure 3:
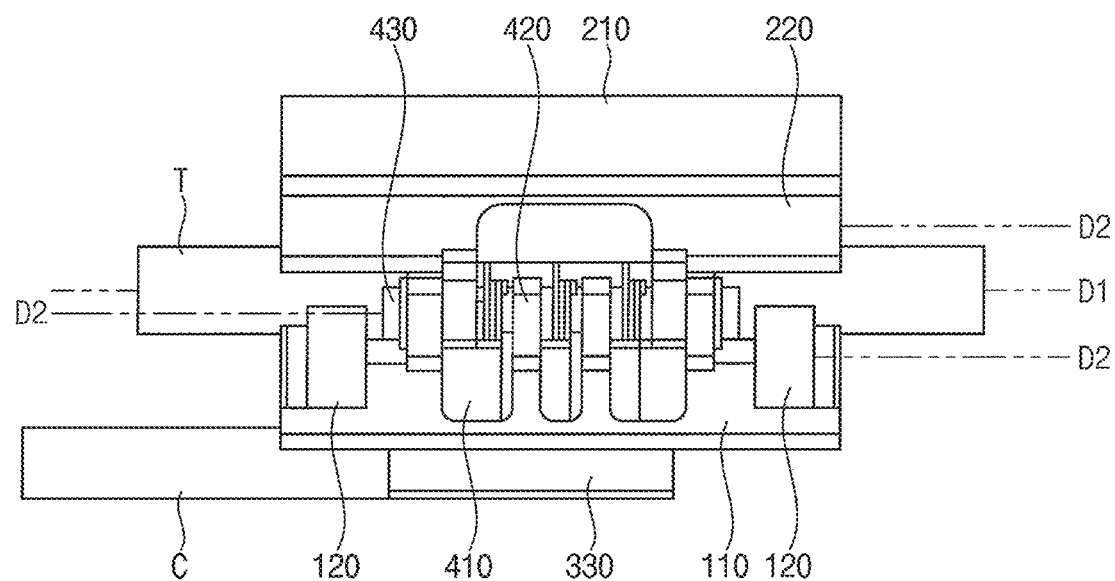
Figure 4:
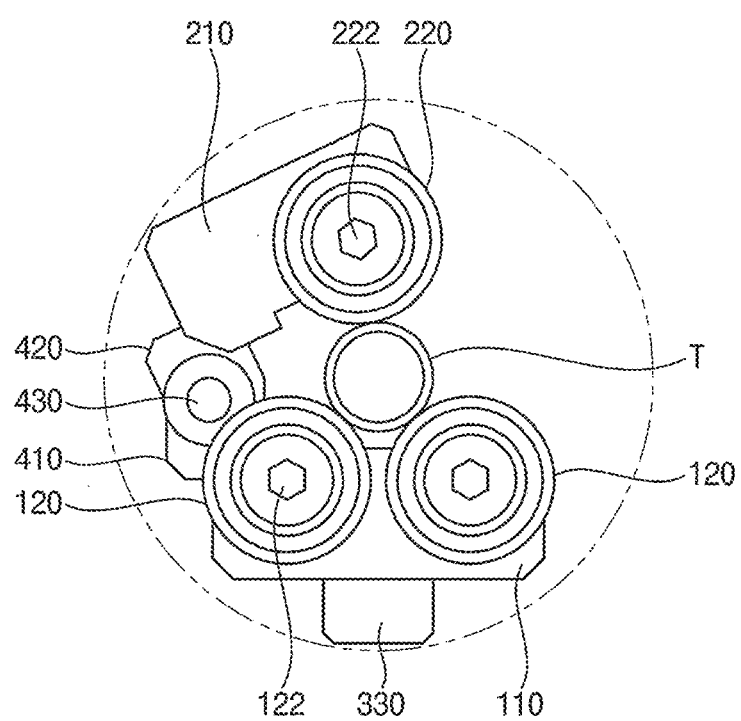
Figure 5:
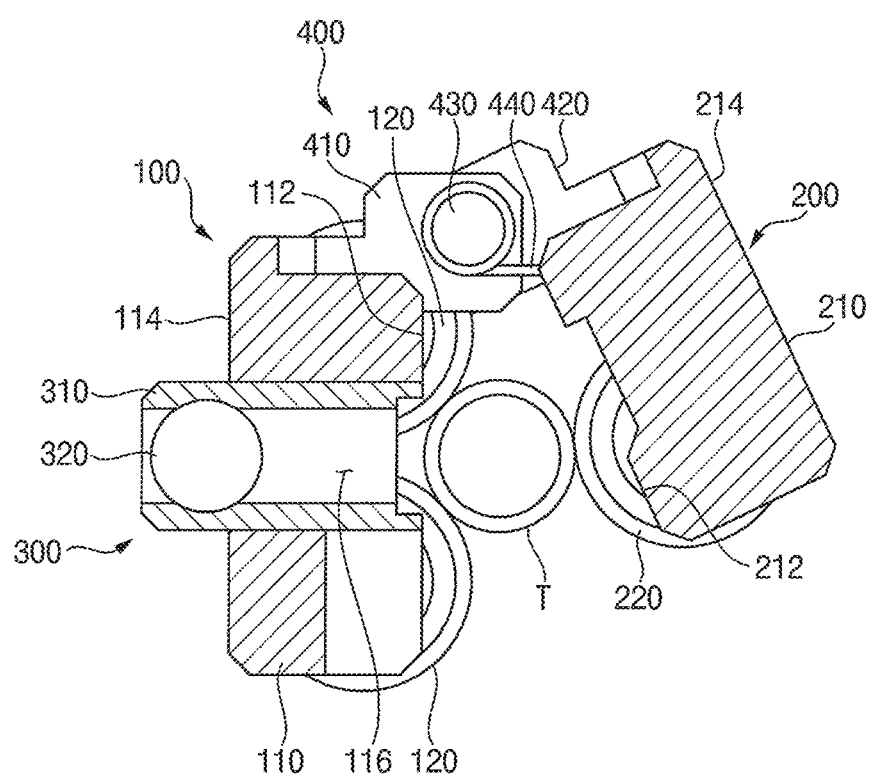
Figure 6:
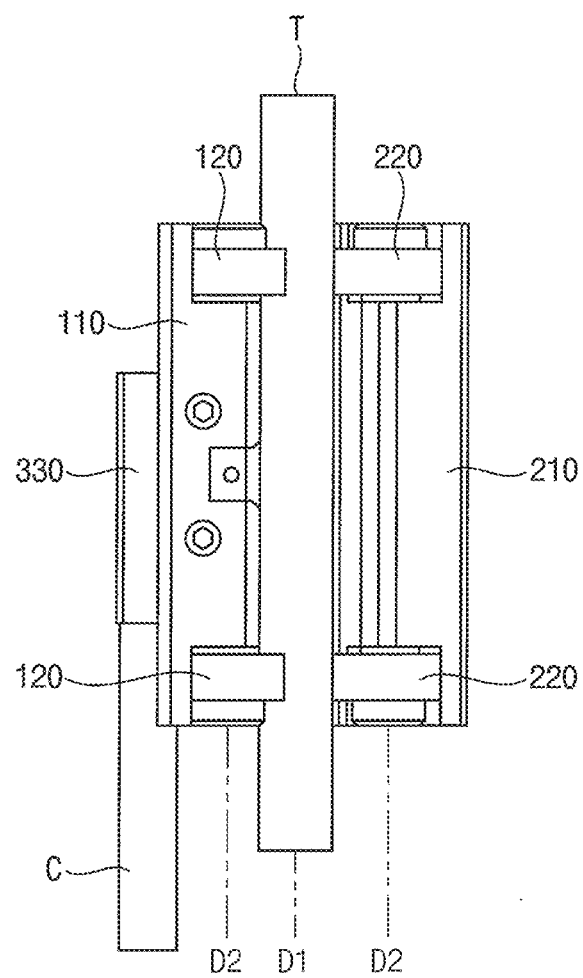

FIGS. 1 and 2 are perspective views illustrating an apparatus for inspecting a tube in accordance with some example embodiments, FIG. 3 is a front view illustrating the apparatus in FIG. 1 in accordance with at least one example embodiment, FIG. 4 is a plan view illustrating the apparatus in FIG. 1 in accordance with at least one example embodiment, FIG. 5 is a horizontal cross-sectional view illustrating the apparatus in FIG. 1 in accordance with at least one example embodiment, and FIG. 6 is a vertical cross-sectional view illustrating the apparatus in FIG. 1 in accordance with at least one example embodiment.

Referring to FIGS. 1 to 6, an apparatus for inspecting a tube in accordance with one or more example embodiments may be used for inspecting a small tube T (e.g., a tubular object, etc.) having a small diameter (e.g., short diameter) by a non-destructive test using at least one eddy current. For example, the inspection apparatus may be used for inspecting a welding portion of the small tube T, but the example embodiments are not limited thereto. For example, the small tube T may have the diameter of approximately 6 mm (+/−10%) to approximately 12 mm (+/−10%), not limited thereto. That is, the inspection apparatus may also be applied to a tube T having a diameter below approximately 6 mm or approximately 12 mm.

The non-destructive test using the eddy current may detect a defect in and/or at the welding portion of the tube T using an electromagnetic induction generated in response to a conductor and/or a magnetic material may be applied to an electric field. Examples of defects in the welding portion of the tube T may include cracks in the welding portion, gaps in the welding portion, etc. When the welding portion of the tube T is normal (e.g., not defective, satisfactory, etc.), a normal and/or desired lift off signal is generated from and/or based on the eddy current induced in the welding portion of the tube T. In contrast, when the welding portion of the tube T is abnormal and/or defective, that is, there is at least one defect in and/or at the welding portion of the tube T, a signal different from the desired lift off signal may be generated due to the defect, etc. In other words, defects in the welding portion (e.g., cracks and/or gaps, etc., in the welding) may obstruct, inhibit, and/or prevent the desired lift off signal from being generated by the eddy current flow induced in the tube T, etc.

The apparatus for inspecting the welding portion of the tube T using the eddy current may include a first probe holder 100, a second probe holder 200, an eddy current sensor module 300 (e.g., an eddy current sensor, an eddy current sensor device, etc.), and/or a hinge connector 400, etc., but the example embodiments are not limited thereto, and the apparatus may include a greater or lesser number of constituent components. The first probe holder 100 and the second probe holder 200 may be configured to hold the tube T, but the example embodiments are not limited thereto, and for example, the apparatus may include a greater or lesser number of probe holders, etc. For example, the first probe holder 100 and the second probe holder 200 may firmly and/or accurately hold the small tube T having the short diameter. The hinge connector 400 may be attached and/or connected to the second probe holder 200 and the first probe holder 100, and the hinge connector 400 may be configured to may rotate the second probe holder 200 in relation to the first probe holder 100 and/or the tube T, and/or may rotate the first probe holder 100 in relation to the second probe holder 200 and/or the tube T, etc.

The eddy current sensor module 300 may be arranged at and/or on any one of the first probe holder 100 and the second probe holder 200, and may be configured to generate the eddy current for inspecting the tube T. Further, the eddy current sensor module 300 may receive a signal reflecting a change of the eddy current induced in the tube T, e.g., a lift off signal.

In some example embodiments, the first probe holder 100 may be configured to hold a first surface portion and/or first surface part of an outer circumferential surface of the tube T, etc. The first probe holder 100 may include a first holding block 110 and/or a plurality of first holding rollers 120, etc., but is not limited thereto.

The first holding block 110 may have a rectangular parallelepiped shape, but the example embodiments are not limited thereto, and the first holding block may have other shapes. Further, the first holding block 110 may be extended in a first direction D1 corresponding to an axial direction of the tube T. Thus, the first holding block 110 may have an inner surface 112 oriented and/or facing toward the tube T and an outer surface 114 opposite to the inner surface 112. The first holding block 110 may have both ends on a second direction D2 parallel and/or substantially parallel (e.g., within +/−10° of the first direction D1) to the first direction D1, but the example embodiments are not limited thereto. Because a direction parallel and/or substantially parallel to the first direction D1, e.g., the axial direction of the tube T, may be in plurals, the second direction D2 may also be in plurals, but the example embodiments are not limited thereto.

The first holding block 110 may include at least one receiving groove 116 configured to receive the eddy current sensor module 300, etc. The receiving groove 116 may be formed at a central portion of the first holding block 110 in a direction perpendicular and/or substantially perpendicular (e.g., within +/−10° of being perpendicular to the first direction D1) to the first direction D1, but the example embodiments are not limited thereto. For example, the receiving groove 116 may be formed through the inner surface 112 and the outer surface 114 of the first holding block 110, but is not limited thereto. Thus, the receiving groove 116 may expose the welding portion of the tube T through the inner surface 112 of the first holding block 110.

Each of the plurality of first holding rollers 120 may be rotatably connected to the first holding block 110 with respect to the second direction D2. The first holding rollers 120 may rotatably make contact with the first portion of the tube T to hold the first portion of the tube T, or in other words, the tube T may contact the first holding rollers 120 and the first holding rollers 120 may rotate while in contact with the tube T, etc. A first roller shaft 122 may be arranged at the first holding block 110 along the second direction D2. The first holding roller 120 may be rotatably connected to the first roller shaft 122. Additionally, the first roller shaft 122 may be rotatably connected to the first holding block 110. In this case, the first holding roller 120 may be fixed to the first roller shaft 122, but the example embodiments are not limited thereto. Thus, the first holding roller 120 may be rotated together with the first roller shaft 122.

In some example embodiments, the first holding rollers 120 may be at least two rollers arranged in the second direction D2, but the example embodiments are not limited thereto. Further, the first holding rollers 120 may be at least two rollers positioned on a direction perpendicular and/or substantially perpendicular to the first direction D1, but are not limited thereto. The at least two first holding rollers 120 on the second direction D2 may be positioned on both sides of the receiving groove 116. In this case, the first portion of the tube T held by, e.g., the four first holding rollers 120 may be four points on the outer circumferential surface of the tube T. Thus, the positions of the first portion of the tube T held by the first probe holder 100 may be determined by the number of the first holding rollers 120.

The eddy current sensor module 300 may be arranged on the first probe holder 100, but is not limited thereto. For example, the eddy current sensor module 300 may be arranged in the receiving groove 116 of the first holding block 110, but the example embodiments are not limited thereto. As mentioned above, because the receiving groove 116 may expose an opening through the inner surface 112 of the first holding block 110, the eddy current sensor module 300 may also be exposed to and/or have access to the tube T. Thus, the eddy current sensor module 300 may induce eddy currents in the tube T through the groove 116. Additionally, the eddy current sensor module 300 may be arranged on the second probe holder 200.

The eddy current sensor module 300 (e.g., eddy current sensor device, etc.) may include a sensor block 310, an eddy current sensor 320, and/or a connection terminal 330, etc. The sensor block 310 may be arranged in the receiving groove 116 of the first holding block 110, but is not limited thereto. The eddy current sensor 320 may be installed at and/or on the sensor block 310. The connection terminal 330 may be arranged at and/or on an outer surface of the sensor block 310 corresponding to the outer surface 114 of the first holding block 110. The connection terminal 330 may be electrically connected to the eddy current sensor 320. At least one cable C for supplying power to the eddy current sensor 320 may be connected to the connection terminal 330, but the example embodiments are not limited thereto, and for example, the cable C may be omitted and/or replaced by, e.g., a battery, etc. In some example embodiments, the connection terminal 330 may protrude from the outer surface 114 of the first holding block 110. Additionally, the connection terminal 330 may not protrude from the outer surface 114 of the first holding block 110. For example, the connection terminal 330 may be coplanar and/or substantially coplanar (e.g., +/−10° of being coplanar, etc.) with the outer surface 114 of the first holding block 110.

The hinge connector 400 may be arranged between, and may be attached to, the first probe holder 100 and the second probe holder 200. The hinge connector 400 may be configured to rotate the second probe holder 200 towards the first probe holder 100 with respect to the second direction D2.

The hinge connector 400 may include a fixed block 410, a hinged block 420, a hinge pin 430, and/or a resilient member 440, etc., but is not limited thereto. The fixed block 410 may be connected to any one of the ends, or both ends, of the first probe holder 100, but is not limited thereto, and e.g., the fixed block 410 may be connected to at least one end of the second probe holder 200. The hinge pin 430 may be installed at the fixed block 410 along the second direction D2. The hinged block 420 may be rotatably connected to the fixed block 410 using the hinge pin 430. Thus, the hinged block 420 may be rotated with respect to the second direction D2. The hinged block 420 may be connected to the second probe holder 200, but is not limited thereto. As a result, the second probe holder 200 may be rotated together with the hinged block 420 with respect to the hinge pin 430.

The resilient member 440 may be installed and/or arranged at the hinge pin 430.

The resilient member 440 may be configured to resiliently push and/or support the second probe holder 200 towards the first probe holder 100. Thus, when an external force is not applied to the second probe holder 200, contact between the first probe holder 100 and the second probe holder 200 may be maintained by the resilient force generated and/or provided by the resilient member 440. The resilient member 440 may include at least one spring, etc., but is not limited thereto.

The second probe holder 200 may be rotatably connected to the first probe holder 100 via the hinge connector 400 with respect to the second direction D2. The second probe holder 200 may include a second holding block 210 and/or at least one second holding roller 220, etc.

The second holding block 210 may have a rectangular parallelepiped shape, but is not limited thereto. Further, the second holding block 210 may be extended in the second direction D2. Thus, the second holding block 210 may have an inner surface 212 oriented toward the tube T and an outer surface 214 opposite to the inner surface 212. The second holding block 210 may have both ends along the second direction D2, but is not limited thereto.

In some example embodiments, a length of the second holding block 210 along the second direction D2 may be the same and/or substantially the same (e.g., within +/−10%) as a length of the first holding block 110 along the second direction D2, not the example embodiments are not limited thereto. For example, the length of the second holding block 210 along the second direction D2 may be longer or shorter than the length of the first holding block 110 along the second direction D2.

The second holding roller 220 may be rotatably connected to the second holding block 210 with respect to the second direction D2. The second holding roller 220 may rotatably make contact with the second portion of the tube T to hold the second portion of the tube T. A second roller shaft 222 may be arranged at the second holding block 210 along the second direction D2. The second holding roller 220 may be connected to the second roller shaft 222 and may rotate around the second roller shaft 222. Additionally, the second roller shaft 222 may be rotatably connected to the second holding block 210. In this case, the second holding roller 220 may be fixed to the second roller shaft 222, but the example embodiments are not limited thereto. Thus, the second holding roller 220 may be rotated together with the second roller shaft 222, etc.

In some example embodiments, the second holding roller 220 may be at least two rollers arranged on the second direction D2, but is not limited thereto. For example, the two second holding rollers 220 may be arranged corresponding to the first holding rollers 120. That is, the two first holding rollers 120 and the one second holding roller 220 may be coplanar and/or substantially coplanar with each other. Thus, the two first holding rollers 120 and the one second holding roller 220 may collectively firmly hold the outer circumferential surface of the tube T.

FIG. 7 is a flow chart illustrating a method of inspecting a tube using the apparatus in FIG. 1 according to at least one example embodiment.

Referring to FIGS. 1 and 7, in operation ST500, at least one external force may be applied to the second probe holder 200 along a direction opposite and/or substantially opposite to the resilient force of the resilient member 440. The second probe holder 200 may be moved away from (and/or far from, etc.) the first probe holder 100 to widen a gap between the first probe holder 100 and the second probe holder 200 in order to accommodate at least the diameter of the tube T.

In operation ST510, the tube T may be arranged on the first holding rollers 120 of the first probe holder 110.

In operation ST520, the external force applied to the second probe holder 200 may be removed. Because the resilient member 440 may resiliently move the second probe holder 200 toward the first probe holder 100, the second probe holder 200 may be rotated toward the first probe holder 100.

In operation ST530, because the tube T may be positioned between the first probe holder 100 and the second probe holder 200, the first holding rollers 120 and the second holding roller 220 may firmly hold at least three points on the outer circumferential surface of the tube T, but the example embodiments are not limited thereto. Further, because the first holding rollers 120 and the second holding roller 220 may be idle rotated, the first holding rollers 120 and the second holding roller 220 may softly make contact with the outer circumferential surface of the tube T. Thus, the tube T may not be damaged by the first holding rollers 120 and the second holding roller 220.

In operation ST540, power may be supplied to the eddy current sensor module 300 through the cable C to generate the eddy current from the eddy current sensor module 300. The eddy current sensor module 300 may be configured to induce eddy currents, which surround the tube T. The eddy current sensor module 300 may induce and/or generate eddy currents having a frequency of approximately 50 kHz to approximately 600 kHz (+/−10%).

In operation ST550, a desired lift off signal may be generated from a normal portion in (and/or satisfactory portion of) the welding portion of the tube T in response to the induced and/or generated eddy currents. In contrast, a signal different from the desired lift off signal may be generated from the abnormal portion in the welding portion of the tube T. The signal different from the lift off signal may be detected and/or observed in response to the eddy currents induced in the tube T to determine whether the welding portion is abnormal and/or includes any abnormalities, etc.

According to some example embodiments, the second probe holder may be rotatably connected to the first probe holder via the hinge connector to firmly hold the small tube having a short diameter using the first probe holder and the second probe holder. Thus, the eddy current sensor module may accurately inspect the welding portion of the small tube held by the first probe holder and the second probe holder.

The foregoing is illustrative of various example embodiments of the inventive concepts and is not to be construed as limiting thereof. Although a few example embodiments have been described, those skilled in the art will readily appreciate that many modifications are possible to the example embodiments without materially departing from the novel teachings and advantages of the inventive concepts. Accordingly, all such modifications are intended to be included within the scope of the inventive concepts as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An apparatus for inspecting a tube, the apparatus comprising:
   a first probe holder configured to hold a first portion of the tube, the first probe holder including,
      a first holding block,
      a plurality of first holding rollers rotatably connected to an inner surface of the first holding block with respect to the axial direction of the tube, the plurality of first holding rollers configured to support the first portion of the tube, and
      a receiving groove, the receiving groove perpendicular to the axial direction of the tube, the receiving groove including an opening between the inner surface of the first holding block and an outer surface of the first holding block opposite the inner surface;
   a second probe holder rotatably connected to the first probe holder with respect to an axial direction of the tube, the second probe holder configured to hold a second portion of the tube; and
   an eddy current sensor on the receiving groove of the first probe holder, the eddy current sensor configured to inspect at least one welding portion of the tube using at least one eddy current, the receiving groove being between a pair of first holding rollers among the plurality of the first holding rollers, and the eddy current sensor being exposed to the tube via the opening of the receiving groove.

2. The apparatus of claim 1, wherein the eddy current sensor further comprises:
   a connection terminal on an outer surface of the first holding block, the connection terminal configured to supply power to the eddy current sensor.

3. The apparatus of claim 1, wherein the second probe holder comprises:
   a second holding block rotatably connected to at least one end of the first probe holder; and
   a second holding roller rotatably connected to an inner surface of the second holding block oriented toward the first probe holder, the second holding roller configured to support the second portion of the tube.

4. The apparatus of claim 1, further comprising:
   a hinge connector connected to the second probe holder and the first probe holder, the hinge connector configured to rotate the second probe holder towards the first probe holder with respect to the axial direction of the tube.

5. The apparatus of claim 4, wherein the hinge connector comprises:
   a fixed block on the first probe holder;
   a hinge pin on the fixed block; and
   a hinged block connected to the hinge pin and the second probe holder, the hinged block configured to rotate around the hinge pin.

6. The apparatus of claim 5, wherein the hinge connector further comprises:
   a resilient member configured to resiliently move the second probe holder toward the first probe holder.

7. The apparatus of claim 6, wherein the resilient member comprises a spring installed at the hinge pin.

8. The apparatus of claim 1, wherein the tube has a diameter between 6 mm and 12 mm.

9. An apparatus for inspecting a tube, the apparatus comprising:
   a first probe holder configured to hold a first portion of the tube, the tube having a diameter between 6 mm and 12 mm, the first probe holder including,
      a first holding block,
      a plurality of first holding rollers rotatably connected to an inner surface of the first holding block with respect to the axial direction of the tube, the plurality of first holding rollers configured to support the first portion of the tube, and
      a receiving groove, the receiving groove perpendicular to the axial direction of the tube, the receiving groove including an opening between the inner surface of the first holding block and an outer surface of the first holding block opposite the inner surface;
   a second probe holder configured to hold a second portion of the tube;

an eddy current sensor on the receiving groove of the first probe holder, the eddy current sensor configured to inspect at least one welding portion of the tube using at least one eddy current, the tube held by the first and second probe holders, the receiving groove being between a pair of first holding rollers among the plurality of the first holding rollers, and the eddy current sensor being exposed to the tube via the opening of the receiving groove; and a hinge connector connected to the second probe holder and the first probe holder, the hinge connector configured to rotate with respect to an axial direction of the tube.

10. The apparatus of claim 9, wherein the eddy current sensor further comprises:
   a connection terminal on an outer surface of the first holding block opposite to a first surface, the connection terminal configured to supply power to the eddy current sensor.

11. The apparatus of claim 9, wherein the second probe holder comprises:
   a second holding block rotatably connected to an end of the first probe holder; and
   a second holding roller rotatably connected to an inner surface of the second holding block, the inner surface of the second holding block oriented toward the first probe holder, the second holding roller configured to support the second portion of the tube.

12. The apparatus of claim 9, wherein the hinge connector comprises:
   a fixed block on the first probe holder;
   a hinge pin at the fixed block;
   a hinged block connected to the hinge pin and the second probe holder, the hinged block configured to rotate around the hinge pin; and
   a resilient member configured to resiliently move the second probe holder toward the first probe holder.

13. A method of inspecting a tube, the method comprising:
   arranging the tube between a first probe holder and a second probe holder, the first probe holder and the second probe holder rotatably connected to each other, the first probe holder including,
      a first holding block,
      a plurality of first holding rollers rotatably connected to an inner surface of the first holding block with respect to the axial direction of the tube, and
      a receiving groove, the receiving groove perpendicular to the axial direction of the tube, the receiving groove including an opening between the inner surface of the first holding block and an outer surface of the first holding block opposite the inner surface;
   rotating the second probe holder toward the tube, the rotating the second probe holder causing the second probe holder and the first probe holder to hold the tube; and
   inspecting at least one welding portion of the tube using an eddy current sensor, the inspecting including inducing at least one eddy current within the tube using the eddy current sensor, the eddy current sensor on the receiving groove of the first probe holder, the receiving groove being between a pair of first holding rollers among the plurality of the first holding rollers, and the eddy current sensor being exposed to the tube via the opening of the receiving groove.

14. The method of claim 13, wherein the inducing the at least one eddy current using the eddy current sensor further includes:
   generating the at least one eddy current with a frequency between 50 kHz and 600 kHz.

15. The method of claim 13, wherein the holding the tube using the first probe holder and the second probe holder further includes:
   moving at least one first holding roller of the first probe holder and at least one second holding roller of the second probe holder such that the at least one first holding roller and the at least one second holding roller contact the tube.

16. The method of claim 13, wherein the tube has a diameter between 6 mm and 12 mm.

* * * * *